United States Patent
He et al.

(10) Patent No.: US 11,333,797 B1
(45) Date of Patent: May 17, 2022

(54) METHOD FOR ESTIMATING QUANTITATIVE PRECIPITATION BY COMBINING OBSERVATION DATA OF WEATHER RADAR AND RAIN GAUGES

(71) Applicant: China Institute of Water Resources and Hydropower Research, Beijing (CN)

(72) Inventors: Xin He, Beijing (CN); Qingyan Sun, Beijing (CN); Chuiyu Lu, Beijing (CN); Lingjia Yan, Beijing (CN); Chu Wu, Beijing (CN); Tao Qin, Beijing (CN)

(73) Assignee: CHINA INSTITUTE OF WATER RESOURCES AND HYDROPOWER RESEARCH, Beijing (CN)

( * ) Notice: Subject to any disclaimer, the term of this patent is extended or adjusted under 35 U.S.C. 154(b) by 0 days.

(21) Appl. No.: 17/452,575

(22) Filed: Oct. 28, 2021

(30) Foreign Application Priority Data

Apr. 14, 2021 (CN) .......................... 202110410676.8

(51) Int. Cl.
*G01W 1/10* (2006.01)
*G01W 1/14* (2006.01)
(Continued)

(52) U.S. Cl.
CPC .............. *G01W 1/14* (2013.01); *G01S 13/95* (2013.01); *G01W 1/06* (2013.01)

(58) Field of Classification Search
CPC ........... G01W 1/14; G01W 1/00; G01W 1/08; G01W 1/16; G01W 1/10; G01W 1/02;
(Continued)

(56) References Cited

U.S. PATENT DOCUMENTS

| 6,581,009 | B1 * | 6/2003 | Smith | G01W 1/10 |
| | | | | 702/3 |
| 8,558,730 | B2 * | 10/2013 | Hassen | G01S 13/956 |
| | | | | 342/91 |
| 2020/0200897 | A1 * | 6/2020 | Eckel | G01W 1/10 |

FOREIGN PATENT DOCUMENTS

| CN | 109001701 A | * 12/2018 |
| CN | 109061646 A | * 12/2018 |

(Continued)

*Primary Examiner* — Andre J Allen
(74) *Attorney, Agent, or Firm* — Bayramoglu Law Offices LLC (57) ABSTRACT

A method for estimating quantitative precipitation by combining observation data of a weather radar and rain gauges includes: acquiring original accumulated data of rain gauges and original accumulated precipitation data of a weather radar to obtain rain gauge-weather radar data G/R pairs matched in the same grid; calculating an observation error of the original accumulated precipitation data of the weather radar through the G/R pairs, and detecting abnormal data to generate an initial correction factor field; determining whether a distance correlation exists between the initial correction factor field and the observation error, and if yes, adjusting the initial correction factor field, and correcting the original accumulated precipitation data of the weather radar through the adjusted correction factor field to obtain corrected accumulated precipitation data of the weather radar; and if not, obtaining the corrected accumulated precipitation data of the weather radar directly through a mean field bias (MFB) factor.

8 Claims, 3 Drawing Sheets

(51) Int. Cl.
*G01S 13/00* (2006.01)
*G01W 1/06* (2006.01)
*G01S 13/95* (2006.01)

(58) Field of Classification Search
CPC ... G01W 1/04; G01W 1/06; G01W 2001/003; G01W 1/17; G01W 1/12; G01W 1/18; G01W 2203/00; G01W 2001/006; G01W 2201/00
See application file for complete search history.

(56) References Cited

FOREIGN PATENT DOCUMENTS

| | | | | | |
|---|---|---|---|---|---|
| CN | 111624682 | A | * | 9/2020 | ............. G01W 1/10 |
| CN | 112965146 | B | * | 9/2021 | ............. G01S 13/86 |
| KR | 20130080683 | A | * | 7/2013 | |

* cited by examiner

METHOD FOR ESTIMATING QUANTITATIVE PRECIPITATION BY COMBINING OBSERVATION DATA OF WEATHER RADAR AND RAIN GAUGES

CROSS REFERENCE TO THE RELATED APPLICATIONS

This application is based upon and claims priority to Chinese Patent Application No. 202110410676.8, filed on Apr. 14, 2021, the entire contents of which are incorporated herein by reference.

TECHNICAL FIELD

The present invention relates to the field of meteorological detection, and more particularly, to a method for estimating quantitative precipitation by combining observation data of a weather radar and rain gauges.

BACKGROUND

Weather radars and rain gauges are common instruments for observing precipitation. Quantitative precipitation data based on weather radar signals are used more and more widely all over the world due to their full automation, high temporal and spatial resolution and strong timeliness.

The transmitter antenna of the weather radar emits electromagnetic waves into the atmosphere. When precipitation occurs, the electromagnetic waves strike raindrops to form reflected echoes, which are received by the receiver antenna of the weather radar. The intensity of the echo signals received by the weather radar increases as the amount and volume of raindrops in the sky increase. It can be inferred that, the intensity of the echo signals received by the weather radar, i.e., the reflectivity (Z) of the weather radar, is closely and positively correlated with the rainfall intensity (R) at that time. The Z-R relationship has become the basis for the inversion of quantitative precipitation from weather radar data.

The Z-R relationship is nonlinear and very complex. As a result, the quantitative precipitation data inverted based on the weather radar signals cannot represent the real precipitation on the ground. There are mainly the following types of errors. The first type is height-related errors. The signals observed by the weather radar come from an altitude of several kilometers instead of the ground, and raindrops change as they fall to the ground. The second type is distance-related errors. Electromagnetic waves are attenuated during transmission, and the attenuation increases with the increase of the distance to the weather radar and the increase of the rainfall intensity. The third is random errors due to weather radar clutter or interference caused by objects other than raindrops, such as aircrafts, birds, and insects. Therefore, it is hard to directly apply the quantitative precipitation data obtained by direct inversion of the weather radar signals.

The precipitation data observed by the ground-based rain gauges is still considered to be the most accurate point-scale measurement data. However, the amount of the ground-based rain gauges is limited due to high maintenance cost. Therefore, the spatial precipitation distribution obtained by interpolation based on the observation data of the rain gauges is not sufficiently accurate. In order to overcome the above shortcomings, the present invention proposes a method for estimating quantitative precipitation by combining observation data of a weather radar and rain gauges. The present invention utilizes the respective advantages of the two types of observation instruments to realize quantitative precipitation estimation that is more accurate in space.

SUMMARY

In order to overcome the above shortcomings of the prior art, the present invention provides a method for estimating quantitative precipitation by combining observation data of a weather radar and rain gauges.

In order to achieve the above objective, the present invention adopts the following technical solution:

A method for estimating quantitative precipitation by combining observation data of a weather radar and rain gauges includes the following steps:

S1: acquiring original accumulated data of the rain gauges and original accumulated precipitation data of the weather radar to obtain rain gauge-weather radar data G/R pairs matched in an identical geographic location grid;

S2: calculating an observation error of the original accumulated precipitation data of the weather radar through the rain gauge-weather radar data G/R pairs obtained in step S1, and detecting abnormal data to generate an initial correction factor field;

S3: determining whether a distance correlation exists between the initial correction factor field and the observation error obtained in step S2; and if yes, proceeding to step S4, otherwise proceeding to step S5;

S4: adjusting the initial correction factor field, and correcting the original accumulated precipitation data of the weather radar through the adjusted correction factor field to obtain corrected accumulated precipitation data of the weather radar; and S5: correcting the original accumulated precipitation data of the weather radar through a mean field bias (MFB) factor to obtain the corrected accumulated precipitation data of the weather radar.

The solution of the present invention has the following beneficial effects:

The observation error and the initial correction factor field are acquired through the matched rain gauge-weather radar data G/R pairs in the identical geographic location grid, and whether the initial correction factor field and the observation error have a distance correlation is determined to obtain the corrected precipitation data of the weather radar. This solution effectively combines the observation data of the weather radar and the rain gauges, and utilizes the respective advantages of the two types of observation instruments to realize quantitative precipitation estimation that is more accurate in space.

Further, step S1 may specifically include the following sub-steps:

S11: retrieving a reflectivity of the weather radar from a weather radar database, and converting the reflectivity into a rainfall intensity to obtain rainfall intensity data of the weather radar by the following formula:

$$R = \left(\frac{Z}{A}\right)^{\frac{1}{b}}$$

where, R is the rainfall intensity of the weather radar, Z is the reflectivity of the weather radar, and A and b are dimensionless parameters; and S12: accumulating the rainfall intensity data obtained in step S11 for 24 hours to obtain the original accumulated precipitation data $R_{(i,j)}$ of the weather radar, and matching the original accumulated precipitation data $R_{(i,j)}$ of the weather radar and the original accumulated data of the rain gauges in an identical geographic coordinate grid to obtain the rain gauge-weather radar data G/R pairs.

The further solution of the present invention has the following beneficial effects:

The radar observes the raindrops in the sky, and the rain gauges observe the actual precipitation on the ground. Therefore, the observations at all times cannot be completely fitted. The 24-hour accumulation of data makes the two observations comparable. The radar obtains the area-scale observation data, and the rain gauge obtains the point-scale observation data. Therefore, it is necessary to find the radar image grid points (pixels) corresponding to each of the rain gauges to make the two observations comparable.

Further, step S2 may specifically include the following sub-steps:

S21: calculating the observation error $F_g$ of the original precipitation data of the weather radar through the rain gauge-weather radar data G/R pairs obtained in step S12 by the following formula:

$$F_g = \log(G/R)$$

where, G is accumulated data of the rain gauges in the matched G/R pairs, and R is accumulated precipitation data of the weather radar in the matched G/R pairs;

S22: calculating a normalized residual $Z_g$ of the original accumulated precipitation data of the weather radar through the observation error $F_g$ obtained in step S21 and a mean value $\overline{F}_g$ of the observation error $F_g$ by the following formula:

$$Z_g = \frac{F_g - \overline{F}_g}{\sigma}$$

where, $\sigma$ is a standard deviation of the observation error $F_g$;

S23: determining whether an absolute value $|Z_g|$ of the normalized residual $Z_g$ obtained in step S22 is greater than a set threshold; and if yes, deleting the data and then proceeding to step S24, otherwise proceeding directly to step S24; and S24: fitting the observation error $F_g$ obtained in step S23 with a distance $r_g$ from the identical geographic coordinate grid to the weather radar to generate the initial correction factor field $F_{r(i,j)}$ by the following formula:

$$F_{r(i,j)} = a + br_g + cr_g^2$$

where, (i,j) are grid coordinates of weather radar data; and a, b and c are dimensionless parameters.

The further solution of the present invention has the following beneficial effects:

The precipitation data is generally distributed in a logarithmic normal, and after the logarithm is taken, it is a general normal distribution, that is, a Gaussian distribution. Therefore, taking the logarithm is convenient for subsequent statistics and calculations. The precipitation correction factor has a nonlinear relationship with the distance. The quadratic equation in one variable is the simplest expression that can describe this nonlinear relationship. Therefore, the fitting using the quadratic equation in one variable can save the calculation cost.

Further, step S3 may specifically include:

evaluating whether the distance correlation exists between the observation error $F_g$ and the initial correction factor field $F_{r(i,j)}$ by a t-test method in a confidence interval of 95%; and if yes, proceeding to step S4, otherwise proceeding to step S5.

The further solution of the present invention has the following beneficial effects:

If the data passes the t-test, it indicates that the error in the precipitation data of the weather radar is caused by the distance. Thus, the corrected initial factor field $F_{(i,j)}$ can be used to correct the original accumulated precipitation data $R_{(i,j)}$ of the weather radar. If the data fails the t-test, it indicates that the coverage of the precipitation is small, and the precipitation is mostly short-term strong convective local precipitation. In this case, there is no need to perform a complicated distance correction on the radar data, and it only needs to directly use an MFB factor for correction. This solution can adapt to various precipitation data conditions and has a wider applicability.

Further, step S4 may specifically include the following sub-steps:

S41: adjusting the initial correction factor field $F_{r(i,j)}$ to obtain the adjusted correction factor field $\overline{F}_{(i,j)}$ by the following formula:

$$\overline{F}_{(i,j)} = F_{r(i,j)} + w_{s(i,j)}(F_{s(i,j)} - F_{r(i,j)})$$

where, $F_{s(i,j)}$ is a spatial analysis correction factor field, and $w_{s(i,j)}$ is a spatial weight; and S42: correcting the original accumulated precipitation data $R_{(i,j)}$ of the weather radar through the correction factor field $\overline{F}_{(i,j)}$ obtained in step S41 to obtain the corrected original accumulated precipitation data $R_{r(i,j)}$ of the weather radar by the following formula:

$$R_{r(i,j)} = R_{(i,j)} \cdot 10^{\overline{F}_{(i,j)}}$$

where, $R_{(i,j)}$ is the original accumulated precipitation data of the weather radar.

The further solution of the present invention has the following beneficial effects:

The final correction factor field $\overline{F}_{(i,j)}$ consists of two parts. The first part considers the distance from the ground observation point to the radar, and corrects the error due to the distance. The second part considers the observation density of the rain gauges when correcting the radar data, and carries out spatial weighting to avoid the problem of excessive dependence on individual observation points due to too few local observation points. The two parts are combined to improve the accuracy of spatial quantitative precipitation estimation.

Further, a method for calculating the spatial analysis correction factor field $F_{s(i,j)}$ in step S41 may include:

S411: calculating a first estimate correction factor field $F_{(i,j)}$ through a weight $w_{g(i,j)}$ of each of the rain gauges in the identical geographic coordinate grid and the observation error $F_g$ by the following formula:

$$F_{(i,j)} = \frac{\sum_{g=1}^{N} w_{g(i,j)} F_g}{\sum_{g=1}^{N} w_{g(i,j)}}$$

where, N is a quantity of G/R pairs, $w_{g(i,j)}$ is the weight of each of the rain gauges in the geographic coordinate grid;

S412: calculating a spatial location correction factor field $\hat{F}_{(i,j)}$ of the rain gauges through the first estimate correction factor field $F_{(i,j)}$ obtained in step S411 and spatial straight-line distances $r_n$ between rain gauges having the smallest distance to a rain gauge in terms of spatial locations by the following formula:

$$\hat{F}_{(i,j)} = F_g - \sum_{n=1}^{4} F_{(i,j)} \frac{1/r_n}{\left(\sum_{n=1}^{4}(1/r_n)\right)}$$

where, n is a quantity of the rain gauges having the smallest distance to a certain rain gauge in terms of the spatial locations; and S413: calculating the spatial analysis correction factor field $F_{s(i,j)}$ through the first estimate correction factor field $F_{(i,j)}$ obtained in step S411 and the spatial location correction factor field $\hat{F}_{(i,j)}$ of the rain gauges obtained in step S412 by the following formula:

$$F_{s(i,j)} = \hat{F}_{(i,j)} + F_{(i,j)}$$

The further solution of the present invention has the following beneficial effects:

The spatial analysis correction factor is first estimated, and then the result of the initial estimate is corrected. In the first estimation, the data of all rain gauges are used to ensure the integrity of the spatial precipitation process. In the correction, only four rain gauges that are closest to a certain rain gauge in space are used so as to ensure the locality of the spatial precipitation process. In this way, the data of the rain gauges can be fully utilized, which takes into account the integrity and the locality, making the generation of the correction factor more scientific and reasonable.

Further, the spatial weight $w_s$ in step S41 may be calculated by the following formula:

$$w_{s(i,j)} = \exp(-D_{p(i,j)}/D_0)$$

where, $D_0$ is a decorrelation distance, and $D_p$ is a local observation density.

The further solution of the present invention has the following beneficial effects:

The purpose of this step is to distinguish whether the precipitation at different locations in the same spatial field belong to the same precipitation system, so as to make the correction result more scientific and reasonable.

Further, step S5 may specifically include the following sub-steps:

S51: calculating the MFB factor through accumulated data $G_i$ of the rain gauges and accumulated precipitation data $R_i$ of the weather radar located in the identical geographic coordinate grid containing the accumulated data $G_i$ of the rain gauges by the following formula:

$$MFB = \frac{\sum_{i=1}^{n} G_i}{\sum_{i=1}^{n} R_i};$$

S52: correcting the original accumulated precipitation data $R_{(i,j)}$ of the weather radar through the MFB factor obtained in step S51 to obtain the corrected original accumulated precipitation data $R_{r(i,j)}$ of the weather radar by the following formula:

$$R_{r(i,j)} = R_{(i,j)} \cdot MFB.$$

The further solution of the present invention has the following beneficial effects:

If the data fails the t-test, it indicates that the coverage of the precipitation is small, and the precipitation is mostly short-term strong convective local precipitation. In this case, there is no need to perform a complicated distance correction on the radar data, and it only needs to directly use an MFB factor for correction through step S5. This solution can adapt to various precipitation data conditions and has a wider applicability.

DETAILED DESCRIPTION OF THE EMBODIMENTS

The specific implementations of the present invention are described below to facilitate those skilled in the art to understand the present invention, but it should be clear that the present invention is not limited to the scope of the specific implementations. Various obvious changes made by those of ordinary skill in the art within the spirit and scope of the present invention defined by the appended claims should fall within the protection scope of the present invention.

The present invention provides a method for estimating quantitative precipitation by combining observation data of a weather radar and rain gauges based on the following assumptions. (1) The point-scale observation values of the rain gauges represent the real precipitation values at respective points. (2) The observation data of the weather radar can reflect the approximate spatial distribution of the regional precipitation field, and the observation error of the weather radar is mainly caused by a distance. (3) The daily-scale accumulated precipitation observations of the weather radar and the rain gauges are comparable.

The specific implementations of the present invention are described in detail below with reference to the drawings.

Figure 1:
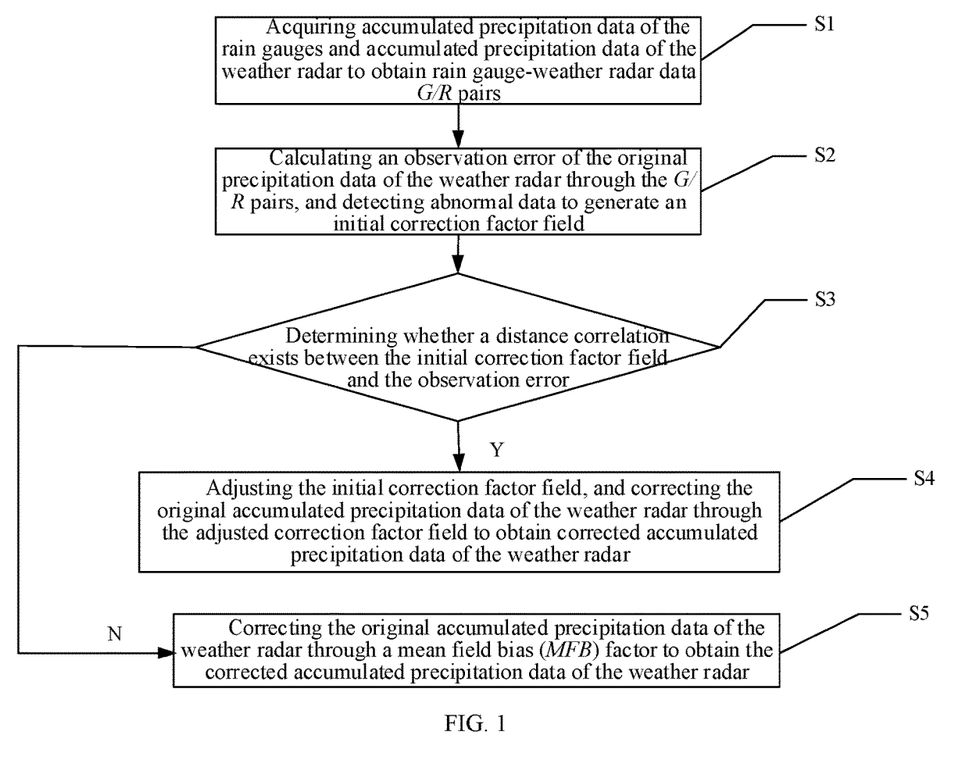
FIG. 1 is a flowchart of a method for estimating quantitative precipitation by combining observation data of a weather radar and rain gauges according to the present invention.

As shown in FIG. 1, the method for estimating quantitative precipitation by combining observation data of a weather radar and rain gauges includes the following steps:

S1: Acquire original accumulated data of the rain gauges and original accumulated precipitation data of the weather radar to obtain rain gauge-weather radar data G/R pairs matched in an identical geographic location grid.

In this embodiment, a reflectivity of the weather radar is acquired from a weather radar database, and the reflectivity of the weather radar is converted into a rainfall intensity, so as to acquire the original accumulated precipitation data of the weather radar. The original accumulated precipitation data of the weather radar and the original accumulated data of the rain gauges are matched in the identical geographic location grid to obtain the rain gauge-weather radar data G/R pairs.

Figure 2:
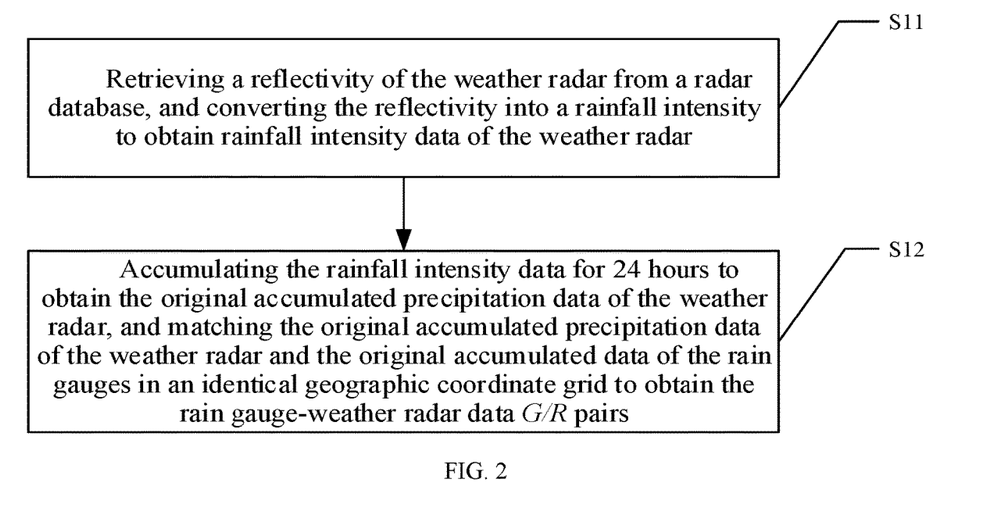
FIG. 2 is a flowchart of step S1 according to the present invention.

As shown in FIG. 2, step S1 specifically includes the following sub-steps:

S11: Retrieve a reflectivity of the weather radar from a weather radar database, and convert the reflectivity into a rainfall intensity to obtain rainfall intensity data of the weather radar by the following formula:

$$R = \left(\frac{Z}{A}\right)^{\frac{1}{b}}$$

where, R is the rainfall intensity of the weather radar, Z is the reflectivity of the weather radar, and A and b are dimensionless parameters.

S12: Accumulate the rainfall intensity data obtained in step S11 for 24 hours to obtain the original accumulated precipitation data $R_{(i,j)}$ of the weather radar, and match the original accumulated precipitation data $R_{(i,j)}$ of the weather radar and the original accumulated data of the rain gauges in an identical geographic coordinate grid to obtain the rain gauge-weather radar data G/R pairs.

In this embodiment, the reflectivity of the weather radar is retrieved from the weather radar database, and is converted into a rainfall intensity through a Marshall-Palmer equation. The rainfall intensity is accumulated for 24 hours and then matched with the daily observations of the rain gauges in the identical geographic location grid to obtain the rain gauge-weather radar data G/R pairs.

S2: Calculate an observation error of the original accumulated precipitation data of the weather radar through the rain gauge-weather radar data G/R pairs obtained in step S1, and detect abnormal data to generate an initial correction factor field.

In this embodiment, numerical control processing is performed on the rain gauge-weather radar data G/R pairs obtained in step S1 to obtain the observation error $F_g$ and a mean value $\overline{F}_g$ of the observation error $F_g$. A normalized residual $Z_g$ is used to determine whether the rain gauge-weather radar data G/R pairs are abnormal, and if yes, the data is deleted, and an initial correction factor field is generated.

Figure 3:
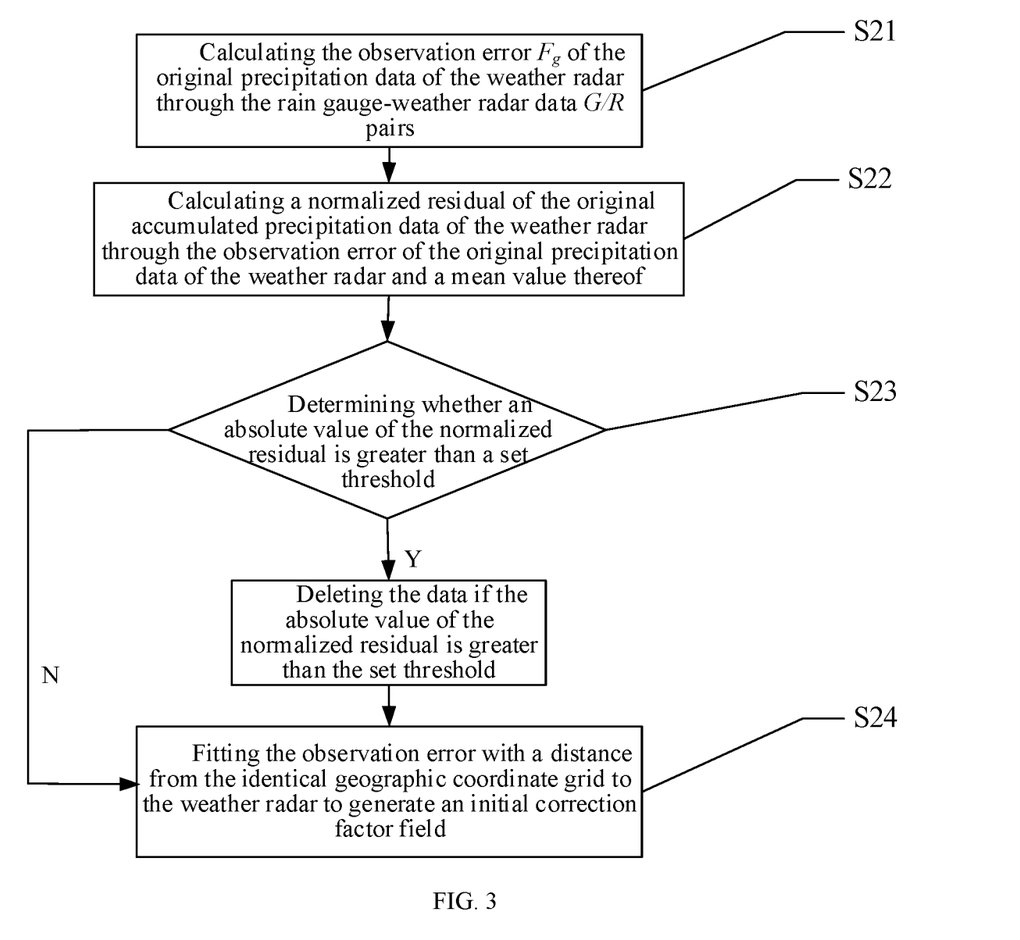
FIG. 3 is a flowchart of step S2 according to the present invention.

As shown in FIG. 3, step S2 specifically includes the following sub-steps:

S21: Calculate the observation error $F_g$ of the original precipitation data of the weather radar through the rain gauge-weather radar data G/R pairs obtained in step S12 by the following formula:

$$F_g = \log(G/R)$$

where, G is accumulated data of the rain gauges in the matched G/R pairs, and R is accumulated precipitation data of the weather radar in the matched G/R pairs.

S22: Calculate a normalized residual $Z_g$ of the original accumulated precipitation data of the weather radar through the observation error $F_g$ obtained in step S21 and the mean value $\overline{F}_g$ of the observation error $F_g$ by the following formula:

$$Z_g = \frac{F_g - \overline{F}_g}{\sigma}$$

where, $\sigma$ is a standard deviation of the observation error $F_g$.

S23: Determine whether an absolute value $|Z_g|$ of the normalized residual $Z_g$ obtained in step S22 is greater than a set threshold; and if yes, delete the data and then proceeding to step S24, otherwise proceed directly to step S24.

S24: Fit the observation error $F_g$ obtained in step S23 with a distance $r_g$ from the identical geographic coordinate grid to the weather radar to generate the initial correction factor field $F_{r(i,j)}$ by the following formula:

$$F_{r(i,j)} = a + br_g + cr_g^2$$

where, (i,j) are grid coordinates of weather radar data; and a, b and c are dimensionless parameters.

In this embodiment, by dividing and taking the logarithm of the rain gauge-weather radar data G/R pairs obtained in step S1 respectively, the observation error $F_g$ of the precipitation data of the weather radar is calculated, the mean value $\overline{F}_g$ of the observation error $F_g$ is calculated, and the normalized residual $Z_g$ of the original accumulated precipitation data of the weather radar is calculated. Through the normalized residual $Z_g$, it is further evaluated whether the observation error $F_g$ calculated at the moment can reflect the characteristics of the sample, and whether the absolute value of the normalized residual $|Z_g|$ is greater than twice the standard deviation $\sigma$ of the observation error $F_g$. If yes, it indicates that there is an abnormality in the G/R pairs, then the abnormal data is deleted and it is determined whether there is a distance correlation. In the determination of the distance correlation, the dimensionless coefficients a, b and c of the initial correction factor field $F_{r(i,j)}$ are obtained by fitting using the corresponding relationship between the observation error $F_g$ and the distance $r_g$ from the geographic coordinate grid to the weather radar. The initial correction factor field $F_{r(i,j)}$ is represented by a nonlinear second-order polynomial.

S3: Determine whether a distance correlation exists between the initial correction factor field and the observation error obtained in step S2; and if yes, proceed to step S4, otherwise proceed to step S5.

In step embodiment, step S3 includes: evaluate whether the distance correlation exists between the observation error $F_g$ and the initial correction factor field $F_{r(i,j)}$ by a t-test method in a confidence interval of 95%; and if yes, proceed to step S4, otherwise proceed to step S5.

S4: Adjust the initial correction factor field, and correcting the original accumulated precipitation data of the weather radar through the adjusted correction factor field to obtain corrected accumulated precipitation data of the weather radar.

In this embodiment, the adjusted correction factor field $\overline{F}_{(i,j)}$ is obtained through the spatial analysis correction factor field $F_{s(i,j)}$ and the spatial weight $w_{s(i,j)}$, and the original accumulated precipitation data $R_{(i,j)}$ of the weather radar is corrected through the correction factor field $\overline{F}_{(i,j)}$ to obtain the corrected original accumulated precipitation data $R_{r(i,j)}$ of the weather radar.

Figure 4:
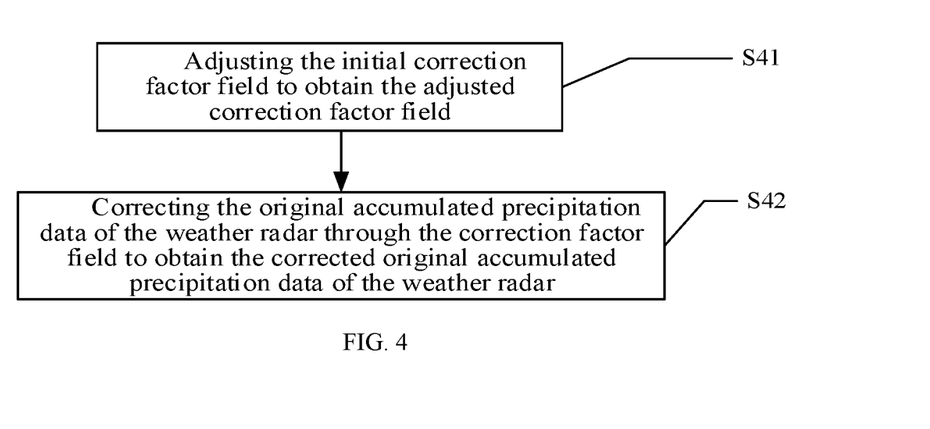
FIG. 4 is a flowchart of step S4 according to the present invention.

As shown in FIG. 4, step S4 specifically includes the following sub-steps:

S41: Adjust the initial correction factor field $F_{r(i,j)}$ to obtain the adjusted correction factor field $\overline{F}_{(i,j)}$ by the following formula:

$$\overline{F}_{(i,j)} = F_{r(i,j)} + w_{s(i,j)}(F_{s(i,j)} - F_{r(i,j)})$$

where, $F_{s(i,j)}$ is a spatial analysis correction factor field, and $w_{s(i,j)}$ is a spatial weight.

The spatial weight $w_s$ in step S41 is calculated by the following formula:

$$w_{s(i,j)} = \exp(-D_{p(i,j)}/D_0)$$

$D_0$ is a decorrelation distance, and $D_p$ is a local observation density. The decorrelation distance $D_0$ is calculated by calculating a semi-variance $\gamma^2$ obtained by calculating a distance between rain gauges that are spaced 10 km apart. The decorrelation distance $D_0$ is twice the distance when the semi-variance $\gamma^2 = 1/e$, where e is a natural constant. The local observation density $D_p$ is the square root of an area covered by rain gauges having the smallest distance to a certain rain gauge in terms of the spatial locations in the geographic coordinate grid.

In this embodiment, the spatial weight $w_s$ is obtained through the decorrelation distance $D_0$ and the local observation density $D_p$.

Figure 5:
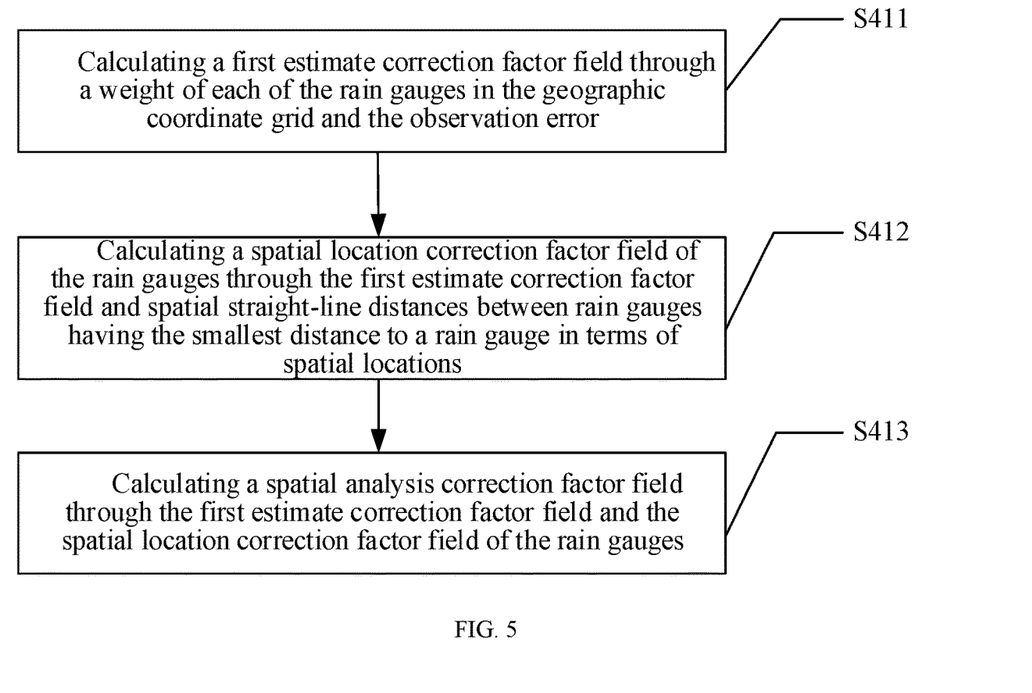
FIG. 5 is a flowchart of step S41 according to the present invention.

As shown in FIG. 5, a method for calculating the spatial analysis correction factor field $F_{s(i,j)}$ in step S41 includes:

S411: Calculate a first estimate correction factor field $F_{(i,j)}$ through a weight $w_{g(i,j)}$ of each of the rain gauges in the geographic coordinate grid and the observation error $F_g$ by the following formula:

$$F_{(i,j)} = \frac{\sum_{g=1}^{N} w_{g(i,j)} F_g}{\sum_{g=1}^{N} w_{g(i,j)}}$$

where, N is a quantity of G/R pairs, $w_{g(i,j)}$ is the weight of each of the rain gauges in the geographic coordinate grid.

S412: Calculate a spatial location correction factor field $\hat{F}_{(i,j)}$ of the rain gauges through the first estimate correction factor field $F_{(i,j)}$ obtained in step S411 and spatial straight-line distances $r_n$ between rain gauges having the smallest distance to a rain gauge in terms of spatial locations by the following formula:

$$\hat{F}_{(i,j)} = F_g - \sum_{n=1}^{4} F_{(i,j)} \frac{1/r_n}{\left(\sum_{n=1}^{4}(1/r_n)\right)}$$

where, n is a quantity of the rain gauges having the smallest distance to a certain rain gauge in terms of the spatial locations.

S413: Calculate the spatial analysis correction factor field $F_{s(i,j)}$ through the first estimate correction factor field $F_{(i,j)}$ obtained in step S411 and the spatial location correction factor field $\hat{F}_{(i,j)}$ of the rain gauges obtained in step S412 by the following formula:

$$F_{s(i,j)} = \hat{F}_{(i,j)} + F_{(i,j)}$$

In this embodiment, the first estimate correction factor field $F_{(i,j)}$ is calculated based on the weight $w_{g(i,j)}$ and the observation error $F_g$ of each rain gauge in the geographic coordinate grid. The spatial location correction factor field $\hat{F}_{(i,j)}$ of the rain gauges is calculated through the first estimate correction factor field $F_{(i,j)}$ and the spatial straight-line distances $r_n$ between the rain gauges having the smallest distance to a certain rain gauge in terms of the spatial locations. The spatial analysis correction factor field $F_{s(i,j)}$ is calculated through the first estimate correction factor field $F_{(i,j)}$ and the spatial location correction factor field $\hat{F}_{(i,j)}$ of the rain gauges.

S42: Correct the original accumulated precipitation data $R_{(i,j)}$ of the weather radar through the correction factor field $\overline{F}_{(i,j)}$ obtained in step S41 to obtain the corrected original accumulated precipitation data $R_{r(i,j)}$ of the weather radar by the following formula:

$$R_{r(i,j)} = R_{(i,j)} \cdot 10^{\overline{F}_{(i,j)}}$$

In this embodiment, the original accumulated precipitation data $R_{(i,j)}$ of the weather radar is corrected by the correction factor field $\overline{F}_{(i,j)}$, and the corrected original accumulated precipitation data of the weather radar $R_{r(i,j)}$ is obtained.

S5: Correct the original accumulated precipitation data of the weather radar through an MFB factor to obtain the corrected accumulated precipitation data of the weather radar.

In this embodiment, for a rain gauge-weather radar data G/R pair that does not have a distance correlation, the original accumulated precipitation data of the weather radar is corrected through the MFB factor to obtain the corrected accumulated precipitation data $R_{r(i,j)}$ of the weather radar.

Figure 6:
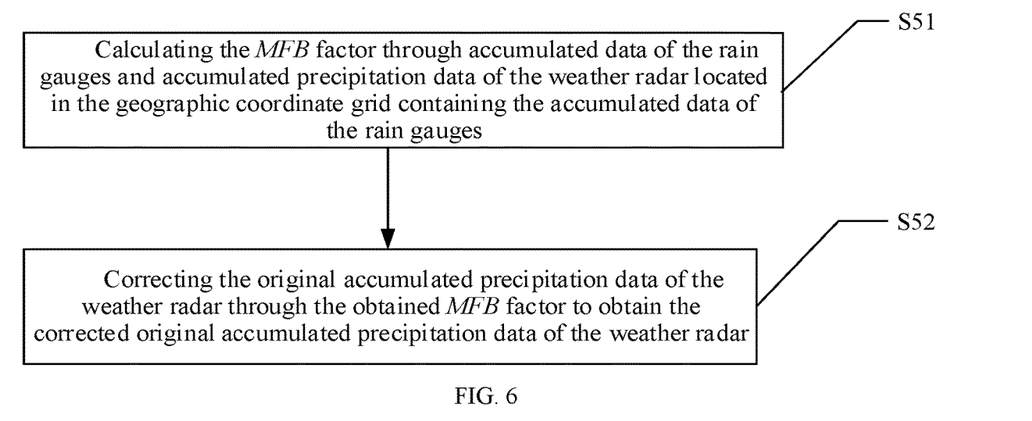
FIG. 6 is a flowchart of step S5 according to the present invention.

As shown in FIG. 6, step S5 specifically includes:

S51: Calculate the MFB factor through accumulated data $G_i$ of the rain gauges and accumulated precipitation data $R_i$ of the weather radar located in the identical geographic coordinate grid containing the accumulated data $G_i$ of the rain gauges by the following formula:

$$MFB = \frac{\sum_{i=1}^{n} G_i}{\sum_{i=1}^{n} R_i};$$

S52: Correct the original accumulated precipitation data $R_{(i,j)}$ of the weather radar through the MFB factor obtained in step S51 to obtain the corrected original accumulated precipitation data $R_{r(i,j)}$ of the weather radar by the following formula:

$$R_{r(i,j)} = R_{(i,j)} \cdot MFB.$$

In this embodiment, through the MFB factor obtained through the accumulated data $G_i$ of the rain gauges and the accumulated precipitation data $R_i$ of the weather radar located in the identical geographic coordinate grid containing the accumulated data $G_i$ of the rain gauges, the original accumulated precipitation data of the weather radar is corrected to obtain the corrected original accumulated precipitation data $R_{r(i,j)}$ of the weather radar.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In this specification, specific embodiments are used to describe the principle and implementations of the present invention, and the description of the embodiments is only intended to help understand the method and core idea of the present invention. Meanwhile, a person of ordinary skill in the art may, based on the idea of the present invention, make modifications with respect to the specific implementations and the application scope. Therefore, the content of this specification shall not be construed as a limitation to the present invention.

Those of ordinary skill in the art will understand that the embodiments described herein are intended to help readers understand the principles of the present invention, and it should be understood that the protection scope of the present invention is not limited to such special statements and embodiments. Those of ordinary skill in the art may make other various specific modifications and combinations according to the technical teachings disclosed in the present invention without departing from the essence of the present invention, and such modifications and combinations still fall within the protection scope of the present invention.

What is claimed is:

1. A method for estimating quantitative precipitation by combining observation data of a weather radar and rain gauges, comprising the following steps:
   S1: acquiring original accumulated data of the rain gauges and original accumulated precipitation data of the weather radar to obtain rain gauge-weather radar data G/R pairs matched in a same grid;
   S2: calculating an observation error of the original accumulated precipitation data of the weather radar through the rain gauge-weather radar data G/R pairs obtained in the step S1, and detecting abnormal data to generate an initial correction factor field;
   S3: determining whether a distance correlation exists between the initial correction factor field and the observation error obtained in the step S2; when the distance correlation exists, proceeding to step S4, and when the distance correlation does not exist, proceeding to step S5;
   S4: adjusting the initial correction factor field to obtain an adjusted correction factor field, and correcting the original accumulated precipitation data of the weather radar through the adjusted correction factor field to obtain corrected accumulated precipitation data of the weather radar; and S5: correcting the original accumulated precipitation data of the weather radar through a mean field bias (MFB) factor to obtain the corrected accumulated precipitation data of the weather radar.

2. The method according to claim 1, wherein the step S1 comprises the following sub-steps:
   S11: retrieving a reflectivity of the weather radar from a radar database, and converting the reflectivity into a rainfall intensity to obtain rainfall intensity data of the weather radar by the following formula:

$$R = \left(\frac{Z}{A}\right)^{\frac{1}{b}}$$

wherein, R is the rainfall intensity of the weather radar, Z is the reflectivity of the weather radar, and A and b are dimensionless parameters; and
   S12: accumulating the rainfall intensity data obtained in the step S11 for 24 hours to obtain the original accumulated precipitation data $R_{(i,j)}$ of the weather radar, and matching the original accumulated precipitation data $R_{(i,j)}$ of the weather radar and the original accumulated data of the rain gauges in the same grid to obtain the rain gauge-weather radar data G/R pairs.

3. The method according to claim 2, wherein the step S2 comprises the following sub-steps:
   S21: calculating the observation error $F_g$ of the original accumulated precipitation data of the weather radar through the rain gauge-weather radar data G/R pairs obtained in the step S12 by the following formula:

$$F_g = \log(G/R)$$

wherein, G is accumulated data of the rain gauges in the rain gauge-weather radar data G/R pairs, and R is accumulated precipitation data of the weather radar in the rain gauge-weather radar data G/R pairs;
   S22: calculating a normalized residual $Z_g$ of the original accumulated precipitation data of the weather radar through the observation error $F_g$ obtained in the step S21 and a mean value $\bar{F}_g$ of the observation error $F_g$ by the following formula:

$$Z_g = \frac{F_g - \bar{F}_g}{\sigma}$$

wherein, $\sigma$ is a standard deviation of the observation error $F_g$;
   S23: determining whether an absolute value $|Z_g|$ of the normalized residual $Z_g$ obtained in the step S22 is greater than a set threshold; when $|Z_g|$ is greater than the set threshold, deleting $Z_g$ and then proceeding to step S24, and when $|Z_g|$ is less than or equal to the set threshold, proceeding directly to the step S24; and
   S24: fitting the observation error $F_g$ obtained in step S23 with a distance $r_g$ from the same grid to the weather radar to generate the initial correction factor field $F_{r(i,j)}$ by the following formula:

$$F_{r(i,j)} = a + br_g + cr_g^2$$

wherein, (i,j) are grid coordinates of weather radar data; and a, b and c are dimensionless parameters.

4. The method according to claim 1, wherein the step S3 comprises:

evaluating whether the distance correlation exists between the observation error $F_g$ and the initial correction factor field $F_{r(i,j)}$ by a t-test method in a confidence interval of 95%; when the distance correlation exists, proceeding to step S4, and when the distance correlation does not exist, proceeding to step S5.

5. The method according to claim 3, wherein the step S4 comprises the following sub-steps:

S41: adjusting the initial correction factor field $F_{r(i,j)}$ to obtain the adjusted correction factor field $\overline{F}_{(i,j)}$ by the following formula:

$$\overline{F}_{(i,j)} = F_{r(i,j)} + w_{s(i,j)}(F_{s(i,j)} - F_{r(i,j)})$$

wherein, $F_{s(i,j)}$ is a spatial analysis correction factor field, and $w_{s(i,j)}$ is a spatial weight; and S42: correcting the original accumulated precipitation data $R_{(i,j)}$ of the weather radar through the adjusted correction factor field $\overline{F}_{(i,j)}$ obtained in step S41 to obtain the corrected accumulated precipitation data $R_{r(i,j)}$ of the weather radar by the following formula:

$$R_{r(i,j)} = R_{(i,j)} \cdot 10^{\overline{F}_{(i,j)}}$$

wherein, $R_{(i,j)}$ is the original accumulated precipitation data of the weather radar.

6. The method according to claim 5, wherein a method for calculating the spatial analysis correction factor field $F_{s(i,j)}$ in step S41 comprises:

S411: calculating a first estimate correction factor field $F_{(i,j)}$ through a weight $w_{g(i,j)}$ of each of the rain gauges in the same grid and the observation error $F_g$ by the following formula:

$$F_{(i,j)} = \frac{\sum_{g=1}^{N} w_{g(i,j)} F_g}{\sum_{g=1}^{N} w_{g(i,j)}}$$

wherein, N is a quantity of the rain gauge-weather radar data G/R pairs, $w_{g(i,j)}$ is the weight of each of the rain gauges in the same grid;

S412: calculating a spatial location correction factor field $\hat{F}_{(i,j)}$ of the rain gauges through the first estimate correction factor field $F_{(i,j)}$ obtained in step S411 and spatial straight-line distances $r_n$ between rain gauges having a smallest distance to a rain gauge in terms of spatial locations by the following formula:

$$\hat{F}_{(i,j)} = F_g - \sum_{n=1}^{4} F_{(i,j)} \frac{1/r_n}{\left(\sum_{n=1}^{4} (1/r_n)\right)}$$

wherein, n is a quantity of the rain gauges having the smallest distance to the rain gauge in terms of the spatial locations; and S413: calculating the spatial analysis correction factor field $F_{s(i,j)}$ through the first estimate correction factor field $F_{(i,j)}$ obtained in step S411 and the spatial location correction factor field $\hat{F}_{(i,j)}$ of the rain gauges obtained in step S412 by the following formula:

$$F_{s(i,j)} = \hat{F}_{(i,j)} + F_{(i,j)}.$$

7. The method according to claim 5, wherein the spatial weight $w_{s(i,j)}$ in the step S41 is calculated by the following formula:

$$w_{s(i,j)} = \exp(-D_{p(i,j)}/D_0)$$

wherein, $D_0$ is a decorrelation distance, and $D_p$ is a local observation density.

8. The method according to claim 1, wherein the step S5 comprises:

S51: calculating the MFB factor through accumulated data $G_i$ of the rain gauges and accumulated precipitation data $R_i$ of the weather radar located in the same grid containing the accumulated data $G_i$ of the rain gauges by the following formula:

$$MFB = \frac{\sum_{i=1}^{n} G_i}{\sum_{i=1}^{n} R_i};$$

S52: correcting the original accumulated precipitation data $R_{(i,j)}$ f the weather radar through the MFB factor obtained in step S51 to obtain the corrected accumulated precipitation data $R_{r(i,j)}$ of the weather radar by the following formula:

$$R_{r(i,j)} = R_{(i,j)} \cdot MFB.$$

* * * * *